April 2, 1957  E. P. GAUGAIN  2,787,664
AUTOMATIC TELEPHONE SWITCHING COMPRISING
ELECTRONIC CONTROL EQUIPMENTS
Filed April 23, 1954  8 Sheets-Sheet 1

Inventor
E. P. GAUGAIN
By
Attorney

Inventor
E. P. GAUGAIN
By Robert Harding Jr.
Attorney

April 2, 1957　　　E. P. GAUGAIN　　　2,787,664
AUTOMATIC TELEPHONE SWITCHING COMPRISING
ELECTRONIC CONTROL EQUIPMENTS
Filed April 23, 1954　　　　　　　　　8 Sheets-Sheet 8

*Inventor*
E. P. GAUGAIN
By Robert Harding Jr
*Attorney*

2,787,664
Patented Apr. 2, 1957

2,787,664

AUTOMATIC TELEPHONE SWITCHING COMPRISING ELECTRONIC CONTROL EQUIPMENTS

Emile Paul Gaugain, Boulogne-sur-Seine, France, assignor to International Standard Electric Corporation, New York, N. Y., a corporation of Delaware Application April 23, 1954, Serial No. 425,234

Claims priority, application France April 24, 1953

3 Claims. (Cl. 179—18)

The present invention relates to improvements in automatic telephone systems comprising electronic control equipments for the establishment of connections.

Automatic telephone systems are known using crossbar multiselectors with transversal bars in which the detection of calls and the hunting for free circuits which can be used for a connection are made by electronic means.

In such systems, when the switching chains for reaching the calling subscriber and the called subscriber are distinguished, one is led to provide complicated electronic switching systems for the choice and the test of the circuits used for completing the connections.

One object of the present invention is to provide an automatic telephone system, in which switching chains may be used indifferently for the connections towards a calling subscriber, towards a called subscriber, or between different control circuits, and in which the choice and the test of the circuits used are made by simple and quick operating electronic means.

According to a feature of the invention, in a switching system having three multiselector stages with transversal bars, namely: a first stage X having $n$ multiselectors each having $n$ outputs, a second stage Y having $n$ multiselectors each having $n$ inputs and $n$ outputs, a third stage Z comprising $n$ multiselectors having $n$ inputs, and connections between the stages X and Y on the one hand and Y and Z on the other hand, provided in order that the outputs of one multiselector of group X may be respectively connected to the inputs belonging to different multiselectors of group Y and in order that the inputs of a multiselector of group Z may be connected to the output belonging to different multiselectors of group Y, a hunting system of a set of two linking means for connecting one of the outputs of a given multiselector of group X to one of the inputs of a given multiselector of group Z, which hunting system comprises in combination: three groups of $n$ sources of different electric characteristics, means to mark the linking means connected to the outputs of a given multiselector of group X by means of a chosen characteristic amongst the first group of sources, means to mark the linking means connected to the inputs of the given multiselector of group Z by means of a characteristic chosen amongst the third group of the sources, means to mark the free linking means connected to the inputs and to the outputs of the multiselectors of group Y with different characteristics for each multiselector, the said characteristics being chosen amongst the second group of sources, means adapted to detect the coincidence of three electrical characteristics belonging to different groups and which characterize respectively a multiselector of group X, a multiselector of group Y and a multiselector of group Z, and means to connect the said means of detection successively to the sets of linking means connected to different multiselectors of group Y.

According to a feature of the invention, each group of sources of electric characteristics is constituted by a group of $n$ impulse generators, each impulse having a duration $t$ and the repetition frequency of the impulses of each source being equal to $pt$, the different sources of a same group being shifted one with respect of others by the duration of an impulse.

According to another feature of the invention, the three groups of different sources differ by the value of the number $p$, the three numbers characterizing the three groups of sources being amongst themselves prime numbers close to $n$.

According to another feature of the invention, hunting means for two free linking means, passing through a multiselector of group Y and permitting the connection of an output of a given multiselector of group X and an input of a given multiselector of group Z, comprises a coincidence detection circuit to detect the coincidence of an impulse of the second group characterising a multiselector of group Y with an impulse of the first group characterising the given multiselector of group X and and impulse of the third group characterising the given multiselector of group Z, associated with means to register, for example, by means of cold cathode tubes, an indication characterising the multiselector of group Y to which are connected the two linking means for connecting the given multiselector of group X to the given multiselector of group Z.

Other objects, features and advantages of the present invention will appear from a reading of the following description of a particular embodiment, the said description being made in relation with the accompanying drawings in which.

Figure 1:
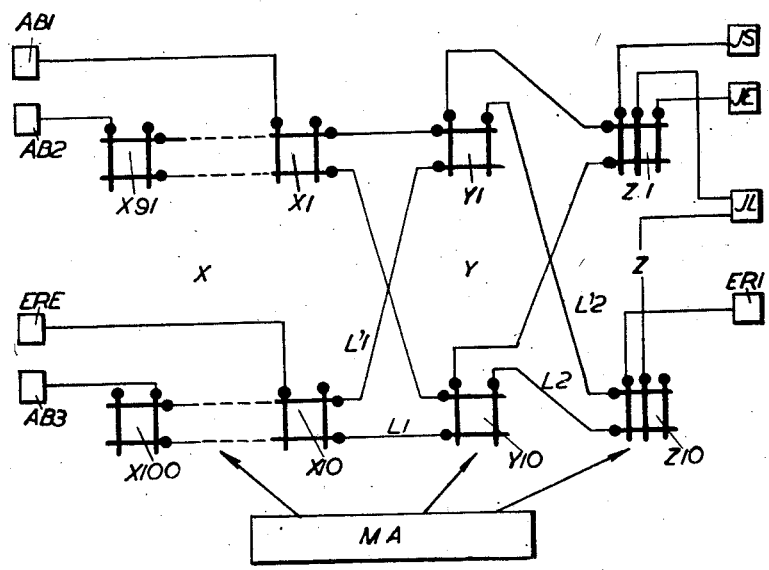
Fig. 1 represents schematically the junction diagram of an automatic telephone system to which the invention is applied.

Reference will be made to Fig. 1 which represents schematically an automatic telephone system using cross bar switches and to which the invention is applied. It will be assumed for example that the multiselectors used comprise each ten vertical selectors with ten points multipled in a conventional way. The telephone system represented comprises three stages X, Y and Z. Subscribers and incoming registers are linked up to the stage X the maximum capacity of which is of 1,000 subscribers in the considered example. When group X is used with its maximum capacity, it comprises ten columns of ten multiselectors, the multiselectors of the same horizontal level being multipled. To simplify the representation, there has been represented in Fig. 1 only the multiselectors X.1 and X.10 of the first column and the multiselectors X.91 and X.100 of the last column. From the point of view of its position on the line frame, connecting the multiselectors X, a subscriber's line is characterised by a vertical selector to which it is linked up, the horizontal level to which the multiselector belongs containing the vertical selector of the subscriber and the column to which this multiselector belongs. To each subscriber is allotted a selector of 10 points, and it will be assumed that it is the same for incoming registers. The stage Y is constituted by ten multiselectors Y.1 to Y.10. The ten outputs of each of the horizontal levels X.1 to X.10 are linked up to ten inputs belonging to different multiselectors of the stage Y, according to a conventional way. The stage Z is constituted by ten multiselectors Z.1 to Z.10. The inputs of multiselectors Z.1 to Z.10 are linked up to outputs of multiselectors Y.1 to Y.10 by identical linking means to those existing between the multiselectors of stage X and stage Y. The initial registers, the outgoing junctions, the incoming junctions and the local junctions are connected to vertical selectors of multiselectors Z.1 to Z.10. There has been represented at AB.1, AB.2, AB.3 subscriber line circuits, at JS an outgoing junction, at JE an incoming junction, in JL a local junction and in ERI an initial register. As will be seen in Fig. 1, local junctions are connected to two vertical selectors belonging to two different multiselctors of stage Z. It will be assumed in the considered example, that the two vertical selectors corresponding to the same local junction are selectors of the same level belonging to two consecutive multiselectors of stage Z (Z.1 being consecutive to Z.10). A marking circuit, which has been represented by a rectangle MA access to associated equipments with different stages and is provided in order to control the connections necessary to the establishment of the call. In a general way, the operation of the circuit is the following:

When a subscriber, AB.3 for instance, wishes to call, the equipment associated with stage X determines the co-ordinates of the calling subscriber, and in this stage indications of these coordinates are transmitted to the marker MA. The marker hunts for an initial available register ERI, whereupon it tests different linking means, such as L.1 and L.2 or L′1 and L′2 which permit the calling subscriber to connect to an initial register. It is easy to understand that there are ten possible circuits permitting a calling subscriber to connect to an initial register. The marker transmits to the register identification elements of the calling subscriber, and as soon as this subscriber is connected to the register by means of circuits chosen by the marker, the marker is released and the calling subscriber may transmit to the register the number of the called subscriber. When the register has received the number of the called subscriber, it is connected to the marker to which it transmits the number of the called subscriber and the number of the calling subscriber. Then the marker hunts for a local junction; then it hunts for a set of two linking means for connecting the called subscriber to the local junction and a set of two linking means for connecting the calling subscriber to this same local junction. The marker is then released. As it will be explained in detail later, the identification of the calling subscriber, the hunting for a local register, the test of the called subscriber or a local junction, and the test of linking means are made by electronic means. In the example considered there is provided only one marker.

Figure 3:
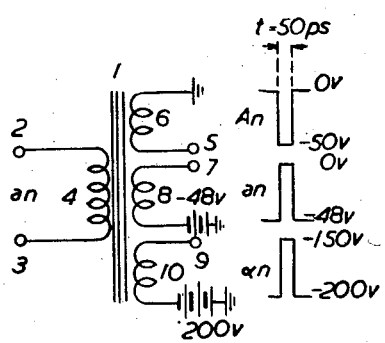
Fig. 3 shows means to obtain impulses with different levels from impulses of Fig. 2.
Figure 2:
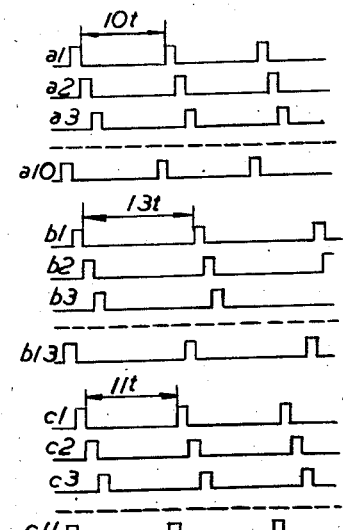
Fig. 2 represents impulse diagrams obtained at the output of an impulse generator used in connection with the automatic telephone system represented in Figs. 5, 6, 7, 8 and 9.

There is shown in Fig. 2 groups of impulses which are used in different points of the circuit represented in Figs. 4, 5, 6, 7, 8 and 9. A central generator which may be of a conventional type, provides impulses of 50 microseconds which are applied to ring circuits, constituted, for example, by flip flop circuits with two stable positions, interconnected in a conventional way. A first circuit provides ten sources of impulses $a.1$, $a.2$ ... $a.10$ displaced by 50 microseconds, one with respect to the others, the duration of a complete cycle being of 500 microseconds. A second circuit provides thirteen sources of impulses $b.1$ ... $b.13$ of 50 microseconds of duration, displaced one with respect to the others by 50 microseconds, the duration of a complete cycle being of 650 microseconds. A third chain provides eleven sources of impulses, the impulses of each source being displaced by 50 microseconds with respect to the impulse of the preceeding source, the duration of a complete cycle being of 550 microseconds. The numbers 10, 13 and 11 being the prime numbers, there is only coincidence between a given impulse of the group $a$, a given impulse of the group $b$ and a given impulse of the group $c$, once every 715 milliseconds, and there is thus determined 1430 positions in time. From the impulses shown in Fig. 2, there are obtained impulses at different levels by means of a transformer such as represented in 1 in Fig. 3. The impulse $a.n$ for example is applied to terminals 2 and 3 of the primary winding 4 of the transformer. There is obtained at terminal 5 of the secondary winding 6 a negative impulse of 50 volts with respect to the ground potential and which is indicated by A.$n$. There is obtained likewise at the terminal 7 of the secondary winding 8 a positive impulse of 48 volts of amplitude with respect to the negative terminal of the battery of 48 volts of the central exchange and this impulse is indicated by $a.n$. Finally, there is obtained at terminals 9 of the secondary winding 10 a positive impulse of 50 volts of amplitude with respect to the negative terminal of battery of 200 volts and this impulse is indicated by $\alpha.n$. In every case, by a capital letter associated with an index will designate the negative impulse with respect to ground, the same small letter associated with the same index will designate the corresponding positive impulse with respect to the negative terminal of the battery of 48 volts, and corresponding Greek letter associated with the same index will designate positive impulse with respect to the negative terminal of the battery of 200 volts.

The operation of the system represented in Figs. 4, 5, 6, 7, 8 and 9 will now be considered.

In these figures, the mode of representation, known under the name of "detached contacts" has been used. The windings of the relays are indicated by one or several capital letters; the contacts, represented in the position in which they are found when the relay is at rest, are indicated by the same letters in small characters associated with a numerical index.

Figure 4:
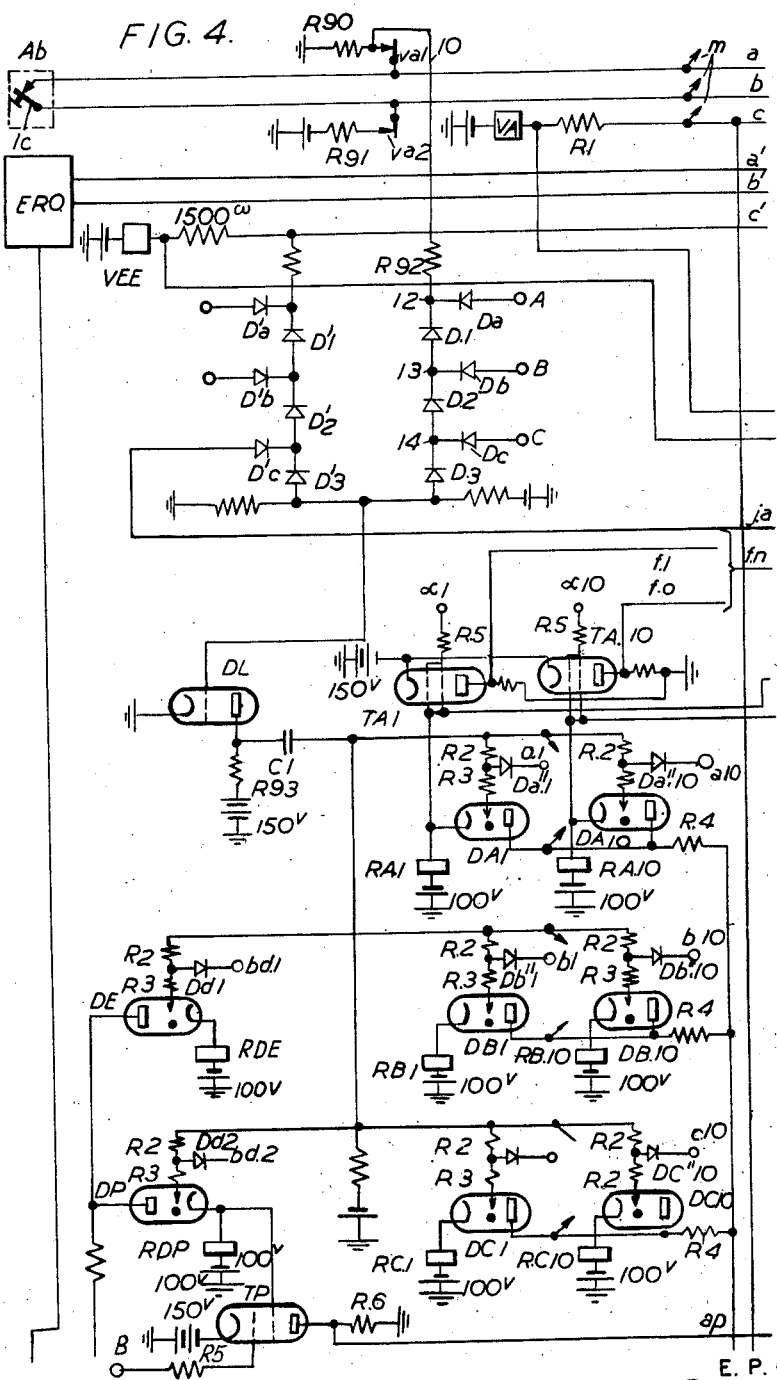
Fig. 4 shows schematically the arrangement used for detection of calling lines and hunting of the incoming registers.

A subscriber station has been represented in Fig. 4 at A$b$, of which the switch hook I$c$ only has been represented. The line circuit is constituted by a resistance of 30,000 ohms connected between the wire $a$ and the ground through contact $va.1$ and through a resistance of 15,000 ohms connected between the negative terminal of battery of 48 volts and the wire $b$ through contact $va.2$. The control electro-magnet of the vertical selector allotted to the subscriber is connected between the negative terminal of the battery and wire $c$ through a resistance R.1. The arrows $m$, represented on wires $a$, $b$, $c$, indicate that these wires are multipled on ten groups of contacts of the vertical selector allotted to the subscriber. When the hand set of the subscriber A$b$ is hung up, contact I$c$ is open in order that point 10 is at the ground potential. When the subscriber takes off his receiver, wires $a$ and $b$ are looped and point 10 is at a potential close to —30 volts. Point 10 is connected through a resistance of 30,000 ohms and three diodes D.1, D.2, D.3 to point 11 of a potentiometer normally maintained at a potential close to —8 volts and to the grid of a vacuum tube DL connected in order to conduct under these conditions. Points 12, 13 and 14 are connected by diodes D.$a$, D.$b$ and D.$c$ respectively to sources of impulses A, B and C. For example the subscriber of the line circuit represented in Fig. 4 may be characterised by an impulse A.2, B.3 and C.7. When potential of point 10 is close to ground potential, diodes D.1, D.2 and D.3 are blocked so that the tube DL remains conductive. If the potential of point 10 is close to —32 volts, a negative impulse is transmitted to the grid of tube DL when impulses A.2, B.3 and C.7, are applied in coincidence in time respectively to diodes D.*a*, D.*b* and D.*c*. Then a positive impulse is obtained at the terminals of the resistance of 20,000 ohms in the anode circuit of tube DL. This impulse is transmitted through condenser C.1 to three series of ten gas tubes DA.1 . . . DA.10, DB.1 . . . DB.10 and DC.1 . . . DC.10. The impulse is applied to the triggering electrode of each cold cathode tube, such as DA.1, through an electronic gate comprising a resistance R.2 of 15,000 ohms, a resistance R.3, of 1 megohm and a diode, such as D*a"*.1. The control of each electronic gate is carried out by means of impulses applied to terminals which have been indicated by means of the same references as the controlling impulses. The cold cathode tubes of the same group DA.1 . . . DA.10 have a common anode resistance R.4 provided in order that only one cold cathode tube may be lit at a time. A relay, such as RA.1, is connected in the cathode circuit of each cold cathode tube and this relay operates when the tube is lit. On the other hand, two cold cathode tubes DE and DP are connected in parallel with the cold cathode tubes DA.1 . . . DC.10. The first ten series of impulses of each group are used for characterising the subscribers in order that each group possess, as has already been indicated, a maximum capacity of 1,000 subscribers. The other series of impulses of groups B and C are used to characterise the incoming register, such as ERO (Fig. 4). There is applied to terminal *bd*.1 of the electronic gate associated with tube DE positive impulses *b.n* ($11 \leqslant n \leqslant 13$) not characterising subscribers and which characterise incoming registers. There is applied to terminal *bd*.2 of the electronic gate associated with the tube DP impulses B.*n* ($11 \leqslant n \leqslant 13$) of opposite polarity. It has been assumed that the subscriber A*b* whose line circuit is represented in Fig. 4 was characterised by impulses A.2, B.3 and C.7. At a position in time corresponding to the coincidence of impulses A.2, B.3 and C.7 a positive impulse is applied from the anode of tube DL to the triggering electrodes of the cold cathode tubes, and tubes DA.2, DB.3 and DC.7 are lit. The tube DP, associated with terminal *bd*.2 to which no negative impulse is applied at the time is lit. Relay RDP then operates and a positive potential is applied to the second grid of tube TP. Impulses $\beta$ are applied to the first grid of tube TP so that negative impulses $\beta$ are obtained at the terminals of anode resistance R6 of tube TP which indicate that the code of the calling subscriber has been registered. These impulses will be used, as will be seen later on, for controlling the hunting of an initial register. Tubes DA1 . . . DA10 are associated respectively with tubes TA1 . . . TA10 each of which operates as an electronic gate having two controlling grids. The second grid of each tube, such as TA.1, is connected to the corresponding cathode of the cold cathode tube DA.1. On the other hand, impulses $\alpha 1 \ldots \alpha 10$ are applied respectively to the first grids of tubes TA.1 . . . TA.10. When a cold cathode tube DA.1 . . . DA.10 is lighted, the corresponding tube TA.*n* may be controlled by positive impulses applied to its first grid, so that negative impulses A.*n*, are obtained at the anode of tube TA.*n*, at a position in time corresponding to the calling subscriber from the point of view of impulses A. As has already been noted, subscribers are characterised by three impulses A*n*, B*m*, and C*p*. Impulse A characterises the horizontal group to which the subscriber selector belongs; impulse B characterises the multiselector which contains the subscriber selector; impulse C characterises the place of the selector in the multiselector, this position being, for example, associated with the unit digit in order to facilitate the translation. Recurrent impulses A*n* are thus obtained on wire *fn* connected to the anode of tube TA.*n* associated with the wire of that cold cathode tubes DA.1 . . . DA.10 which is lighted, which recurrent impulses A*n* characterise the horizontal level of stage X.

It has been assumed that $\alpha 1 \ldots \alpha 10$ will be applied to the second grids of tubes TA.1 . . . TA.10, respectively which impulses correspond to impulses *a*.1 . . . *a.n* which impulses correspond to impulses *a*.1 . . . *a.n* applied to the associated cold cathode tubes DA.1 . . . DA.10. In fact, this correspondence between impulses $\alpha n$ and *a.n* is not necessary, and in particular, a shifting between these impulses can be provided in order not to take into consideration the necessary time to light the cold cathode tubes controlling tubes TA.1 . . . TA.10. In a general way, recording and hunting systems associated with stages X, Y and Z, though controlled from the same impulse sources, operate in an independent manner provided that the correspondences between controlling impulses of the hunting system of linking means of Fig. 5 be suitably determined.

A subscriber of stage X may be connected to a junction of stage Z through ten channels passing through different multiselectors of stage Y. Each multiselector of stage Y is characterised by an impulse B taken amongst the second group of sources. It is then possible to characterise all the linking means between group X and group Y by the combination of an impulse A characterising the horizontal group of X and an impulse B characterizing the multiselector Y. In the same way, linking means between stage Y and stage Z may be characterised by the combination of an impulse B characterising the multiselector of group Y and an impulse C characterising the multiselector of group Z to which the hunted linking means are connected. Each linking means between group X and group Y (Fig. 5) comprises three wires $a'j$, $b'j$, $c'j$, and each linking means between group Y and group Z comprises also three wires $a'k$, $b'k$, and $c'k$. Impulses B*n* ($1 \leqslant n \leqslant 10$ for example) are applied by diode *d*.10 and by diodes *dj* and *dk* respectively to wires $c'j$ and $c'k$. Impulse B.1 is applied in this way to ten linking means which arrive at multiselector Y.1 and to the twenty linking means which are leaving from this same multiselector, as is indicated by multipling-arrows F.1 and F.2. In the same way, impulses B.2 are applied to wires $c'j$ and $c'k$ of the linking means connected to multiselector Y.2 and so on. Each conductor *fn* is connected by a diode, such as *dn*, to each linking means between stage X and stage Y leading to horizontal group *n* of stage X. Conductors *fn* are normally at ground potential, except during the positions in time corresponding to impulses A*n* during which the corresponding conductor is carried to potential —50 volts. Wire $c'j$ connected to the negative terminal of a battery of 48 volts by a resistance R94 of 20,000 ohms, is normally at a potential close to —48 volts when this linking means is free. When the linking means is busy, a ground is connected to wire $c'j$, as will be seen later, so that this wire is at a potential close to the ground potential. A similar arrangement comprising diode $d'n$, diode *dk* and resistance R95 of 60,000 ohms is connected to wire $c'k$, this electronic gate arrangement being controlled by conductor *g.n*, as will be explained later. The potential of wire $c'k$ is close to —48 volts when the controlled electro-magnet is at rest and is close to ground potential when VL is actuated. It is easy to understand that in order to have point 12 at a negative potential close to 48 volts, it is necessary that corresponding conductors *f.n* and *g.n* be at a potential close to —50 volts, and that wires $c'j$ and $c'k$ be also at a negative potential (close to —48 volts), these two last conditions indicating that the corresponding linking means are free. The complete operation of this circuit for the hunting of two linking means permitting the connection of a calling subscriber to an initial register will be mentioned later.

As has been mentioned above, negative impulses appear at terminals of the resistance R.6 connected to the anode of tube TP (Fig. 4), when the code of a calling subscriber has been recorded. These impulses are applied by a wire *ap* (Figs. 4, 5 and 6) to the diode *d.e* (Fig. 6) of an arrangement of rectifiers similar to the one used in Fig. 1 for the detection of calling lines. As has been indicated in relation with Fig. 1, the initial registers ER1 are connected to the stage Z and one has been represented in Fig. 6. A vertical selector of a multiselector is allotted to each initial register and at VE1 the control electro-magnet of a vertical selector corresponding to the initial register ER1 has been represented. It is understood that if the initial register is free, the electro-magnet of the corresponding vertical selector is not actuated and point 14 is at a potential close to −48 volts, whilst if the initial register is busy, a ground is connected to wire $c$ to operate the vertical electro-magnet VEI, so that point 14 is at a potential close to ground potential. The initial registers are characterised by impulses A and C which are applied to terminals A.e and C.e. It is easy to understand that if ten impulses A and ten impulses C are used, one hundred initial registers must be characterised. The arrangement is constituted by diodes $di.1 \ldots di.5$, resistances R100 and R101 of 72,000 ohms and of 360,000 ohms, respectively, and tube DJ operates in a similar way as the one of the described arrangement in relation with the detection of a calling subscriber. As soon as an impulse B characterising an initial register is obtained from tube TP (Fig. 4), and is applied to diode d.e, indicating that the code of a calling subscriber has been registered, a negative impulse appears at the grid of tube DJ as soon as the combination of impulses A and C characterising a free initial register is applied to terminals A.e and C.e in coincidence with impulse B. A positive impulse appears at the terminals of the anode R102 of 20,000 ohms of tube DJ and this impulse is applied to point 15, through condenser C2.

Figure 6:
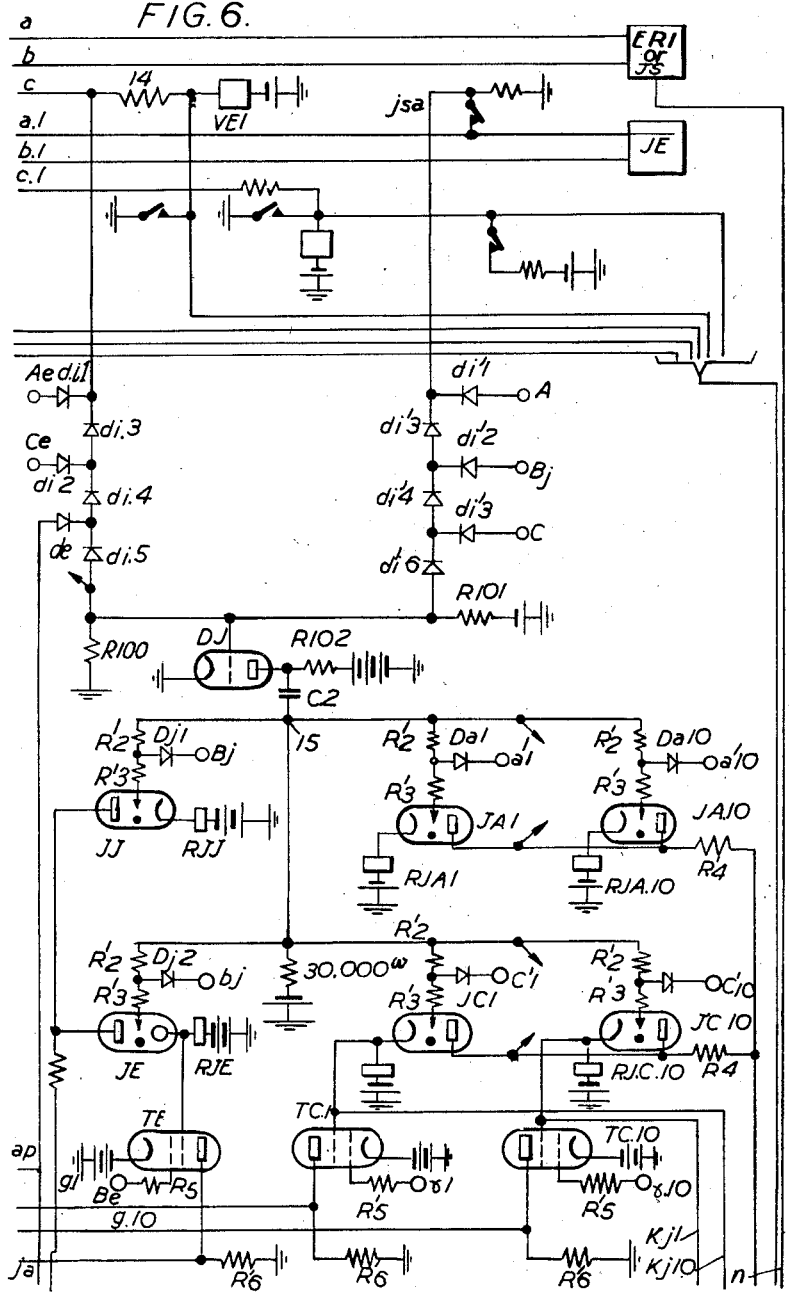
Fig. 6 shows schematically arrangements used for hunting of the outgoing junctions of the initial registers of the local junctions and detection of the incoming junctions.

In Fig. 6 has been shown an arrangement of cold cathode tubes similar to the one used for the registering of the calling subscriber code and which is used in Fig. 6 for the registering of the code of a free initial register. The elements which, in this part of Fig. 6, fulfil similar functions to those of corresponding elements of Fig. 1 have been indicated by the same references to which has been added the index "'". On the other hand, terminal $a'.1 \ldots a'.10, c'.1 \ldots c'.10$ receive impulses respectively identical to those applied to terminals of Fig. 4 having the same references. It is easy to understand that when a positive impulse appears at point 15, indicating that an initial register is free, a tube of group $JA.1 \ldots JA.10$ and a tube of group $JC.1 \ldots JC.10$ are lighted and the corresponding relays operate. Moreover tubes $TC.1 \ldots TC.10$, operating as electronic gates, are respectively associated with tubes $JC.1 \ldots JC.10$. Impulses $1 \ldots 10$ or shifted impulses are applied to the first grids of these tubes, as has been indicated in connection with Fig. 4.

The result is that when one of the cold cathode tubes $JC.1 \ldots JC.10$ is lighted, tube $TC.1 \ldots TC.10$ associated therewith gives to its anode negative impulses C which are applied by corresponding conductor $g.1 \ldots g.10$ (Figs. 6 and 5) to control the coincidence electronic gate used for the hunting of free junctions. Two other cold cathode tubes JJ and JE (Fig. 6) are connected in parallel with the other cold cathode tubes JA.$n$ and JC.$n$. There is applied to terminal B.$j$ the impulse or impulses $b$ which characterise incoming junctions, whilst there is applied to terminal b.$j$ reverse impulses, in order that in the considered case of the hunting of a free register, the tube JJ is lighted causing the operation of relay RJJ. As has been mentioned above, each register is characterised by two impulses A and C. The impulse C characterises in the considered example the multiselector to which is connected the initial register ERI, whilst the impulse A characterises for example the vertical selector to which is connected the initial register. Then there is obtained on one of the conductors $g.1 \ldots g.10$ corresponding to the tube $JC.1 \ldots JC.10$ which is lighted, negative impulses C which characterise the multiselector to which is connected the chosen initial register.

Figure 5:
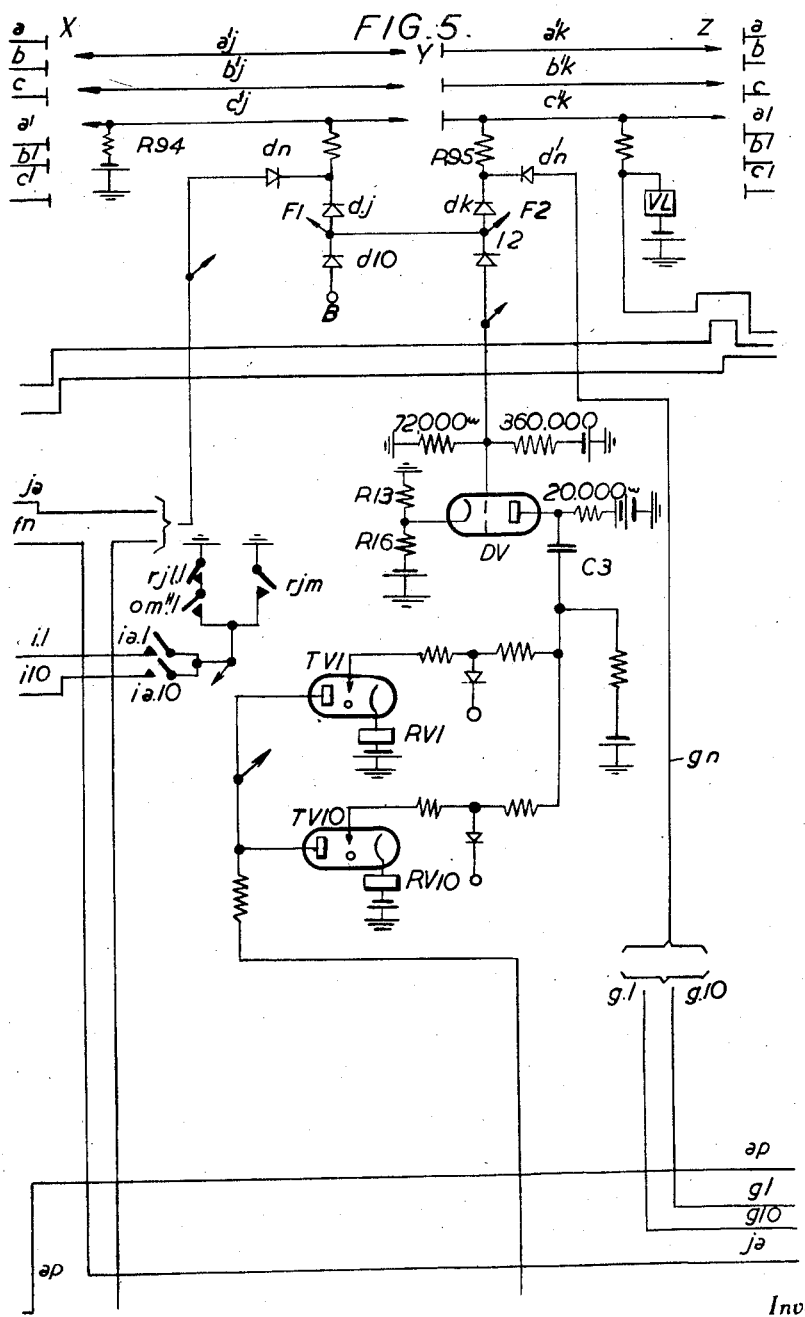
Fig. 5 shows elements used for the choice and test of the linking means between stages X, Y and Z.

Fig. 5 will be now considered. Each conductor $g.n$ controls in parallel electronic gates associated with wires $c'k$ of the linking means which permit reaching the multiselector $n$ of stage Z and are therefore a linkage means for a selector of stage Y. As has been noted in relation with the description of the arrangement of coincidence electronic gates, for obtaining a negative impulse at point 12 (Fig. 5) it is necessary that there be a coincidence between a negative impulse applied to terminal B which characterises a multiselector of stage Y and a negative impulse applied through a conductor $f.n$ characterizing a multiselector of group X; a negative impulse applied through a conductor $g.n$ characterising a multiselector of stage Z, and negative potentials on associated conductors $c'j$ and $c'k$, indicating that the corresponding linking means are free. When, during the exploration cycle, these conditions are fulfilled, a negative impulse appears at point 12 so that a positive impulse is obtained at the anode of tube DV connected in a similar way to tube DL (Fig. 4) the position in time of which characterises two linking means going through a multiselector Y and permitting the connection of a given multiselector of the group X and a given multiselector of the group Z. A set of 10 cold cathode tubes $TV.1 \ldots TV.10$, connected in the same way as tubes $DA.1 \ldots DA.10$ (Fig. 4), permits the registering of the multiselector code Y and may be used for connecting the two given multiselectors of stage X and of stage Y respectively. Each tube $TV.1 \ldots TV.10$ is associated with an electronic gate, as in the similar circuit of Fig. 4 and electronic gates are respectively controlled by impulses $b.1 \ldots b.10$. Relays $RV.1 \ldots RV.10$ are connected in the cathode circuits of tubes $TV.1 \ldots TV.10$. At this operating stage, the code of the calling subscriber is recorded on relays associated with the cold cathode tubes of the call detecting circuit (Fig. 4), the code of a free initial register is registered on actuated relays of the register hunting circuit (Fig. 6) and the indication of the multiselector Y which may be used to connect the calling subscriber to the initial register is registered on relays $RV.1 \ldots RV.10$ (Fig. 5). These indications are transmitted by means, which have not been represented but which are well known in the art, to the control circuit CE (Fig. 9) of the electromagnets of selectors which circuit then controls the establishment of the connection between the calling subscriber and the initial register. As soon as the connection is established, the hunting and controlling circuits which constitute the marking circuit are released and may serve for another call. The grounds which are connected to wires $c$ for the control of electro-magnets VA (Fig. 4), VEI (Fig. 6) and VL (Fig. 5) occupy the linking means used in carrying the potentials of wires $c'j$ and $c'k$ to a potential close to the potential of the ground. It will be understood that for controlling the establishment of the connection, the marking circuit must cause the operation of horizontal selection electro-magnets and vertical maintenance electro-magnets. It is easy to understand that when a set of two linking means has been chosen by means of the circuit represented in Fig. 5, the marker determines by means well known in the art the selecting electro-magnets which must be actuated in the different stages X, Y, Z. Thus, for example, when a linking means has been chosen between stage X and stage Y, the multiselector of stage Y to which the linking means is connected determines the selection electromagnet of the switching of stage X to which the other end of the linking means is connected. Such circuits are well known in the art and their detailed description is not comprised in this invention. The initial register which is connected to the calling subscriber transmits the dialling tone to him and it then registers the number of the called subscriber transmitted by the calling subscriber. When the number of the called subscriber is registered, the registering circuit ERI seizes a marker. Means which have been used to cause the connection of the marker to a registering circuit have not been represented. Meanwhile it must be understood that as soon as the register has received from the calling subscriber the number of the called subscriber, it causes the operation of connecting circuits, which have not been represented, the said connecting circuits establishing circuits, such as $n$ (Figs. 6 and 9) between the register and the marker. Such circuits are well known in the art and consequently have not been described. The initial registering circuit ERI transmits by a set of conductors indicated schematically by the connection $n$ (Figs. 6 and 9) the complete number of the called subscriber and also the co-ordinates of the calling subscriber. Each digit of the number of the called subscriber is registered on a group of relays, ten for example. To simplify the showing, there has only been represented a single relay for each registered digit. Two groups of relays PA, PB are used for registering the two characters indicating the central exchange to which the called subscriber is connected, whilst the groups of relays IC, ID, IU, are used for registering the three numerical digits of the called subscriber's number. On the other hand, the groups of relays IA, IB, IC, are used to register the three co-ordinates of the calling subscriber in the central exchange. There is shown at TE an equipment which permits the reception of indications under any form from the register, for example under the form of vocal frequency combinations, and which causes the operation of corresponding relays. On the other hand, as soon as the equipment receives information from the register, it causes the momentary operation of relay O'M which, by the operation of its contact $o'm.1$ (Fig. 8) opens the feeding circuit of high voltage of the gas tubes of detection arrangements in order to switch off these tubes. From relays PA and PB actuated, it is determined whether the call is a local call or if it is intended for a subscriber belonging to a distant central exchange. This determination is made by means of sets of contacts or by means of any other arrangement. In the considered case, there has been represented two sets of contacts $pa.1$ and $pb.1$ on one hand, and $pa.2$ and $pb.2$ on the other hand, which correspond respectively to a distant call and to a local call. In the case of a distant call, a group of contacts such as $pa.1$ and $pb.1$ connects a ground through a distribution frame $Rp$, represented schematically by two parallel levels of terminals, such as 18 and 19, to the second grid of a tube TR operating as an electronic gate. This grid is biased normally to a negative potential of —100 volts for example, from a battery and through a resistance R.7. There is applied to the first grid of tube TR (Fig. 9) through resistance R.8 recurrent impulses $\beta.n$ which characterise the outgoing junctions which permit reaching the called subscriber exchange characterised by actuated relays PA and PB. There are as many tubes TR as different groups of outgoing junctions. There is obtained at terminals of resistance R"6 of the anode of tube TR, impulses $\beta.n$ which are applied through a conductor $j.a$ (Figs. 9 and 6) to a diode, such as $d.e.$, forming a part of the diode pyramid (Fig. 6) used for the hunting for a free register. The outgoing junctions are connected, as has been indicated, in the same way as the initial registers, the codes of these two types of circuits being differentiated by impulses B. The hunting circuit represented at the lower part of Fig. 6 operates exactly in the same way as in the case of an initial register so that the code of a free outgoing junction permitting reaching the exchange to which is connected the called subscriber, is registered on relays RJA.1 . . . RJA.10 and RJC.1 . . . RJC.10. There is then obtained on one of the conductors $g.1$ . . . $g.10$ impulses C which characterise the multiselector of stage Z up to which the outgoing junction is linked. The information on co-ordinates of the calling subscriber in the central exchange to which he is connected are used to control on the one hand the operation of one of the tubes TA.1 . . . TA.10 (Fig. 4) and, on the other hand, the operation of electro-magnets of selection. For this purpose the first grids of tubes TA.1 . . . TA.10 are respectively controlled by contacts $ia.1$ . . . $ia.10$ (Fig. 5) of relays IA (Fig. 9) on which are registered the co-ordinates of the horizontal level of the multiselector to which the calling subscriber is connected. The circuits controlled by contacts $ia.1$ . . . $ia.10$ are under the control of contact $om"1$. Relay OM" (Fig. 9) is slightly slow to operate, so that the immediate application of a ground on the first grid of a tube TA.$n$ (Fig. 4) in the case of a local is avoided. When relay OM" attracts its armature with a predetermined delay with respect to the attraction of relay O'M, a ground is applied through a circuit going through a contact of relay IA, a conductor $i.1$ . . . $i.10$ (Figs. 5 and 4) to the grid of the corresponding tube TA (Fig. 4). Then there is obtained, as has been explained above, impulses A on a conductor $fn$ (Figs. 4 and 5), these impulses characterising the horizontal level of the multiselector to which the called subscriber is connected. The information on the other coordinates of the calling subscriber which are registered on the groups of relays IB and IC are transmitted by means of well known switching means to the control circuit CE (Fig. 9) for the control of selection electromagnets. The operation of the circuit which leads to the connection of the called subscriber to the outgoing junction is identical to the operation described in relation with the connection of a calling subscriber to an initial register.

Now there will be considered the case of a local call.

When the combination of a relay PA and a relay PB (Fig. 9) indicates that the called subscriber belongs to the same central exchange as the calling subscriber, the translating circuit which has been represented schematically by contacts $pa.2$ and $pb.2$ causes, through the distribution frame $Rp$ the operation of a tube JO identical to tube TR and which characterises the local junctions. The ground connected by contacts $pa.2$ and $pb.2$ also causes the operation of a relay RJL which characterises the local call. Impulses B.$m$ are applied to the terminal connected to the first grid of tube JO through resistance R"8 which impulses characterise the local junctions on the side of the called subscriber. Impulses B are obtained at the anode of tube JO which characterise the local junctions from the point of view of the multiselector by means of which they may be connected to the called subscriber. As in the case of the hunting of a register or the hunting of an outgoing junction, these impulses cause the registering of the code of a free local junction on the side of called subscriber in the registering circuit shown at the lower part of Fig. 6.

Figure 7:
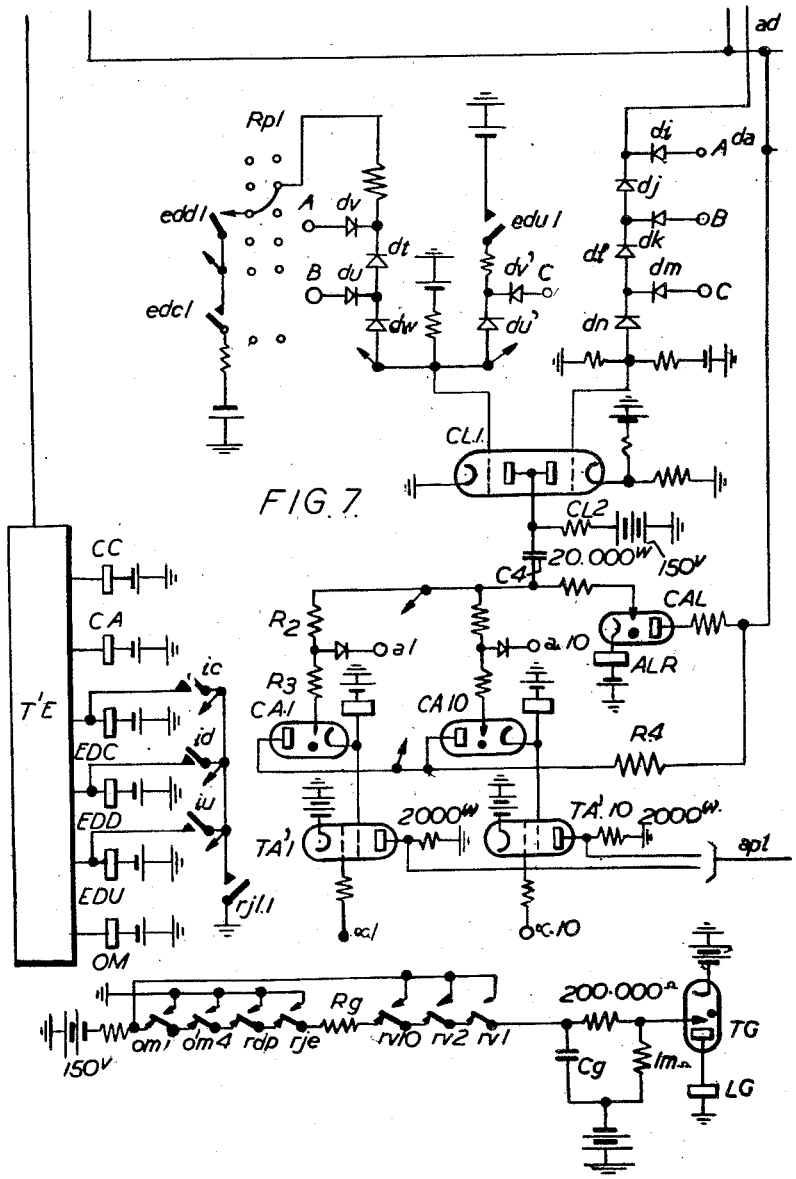
Figs. 7, 8 and 9 represent schematically arrangements of a marking circuit used for applying features of the invention.
Figure 9:
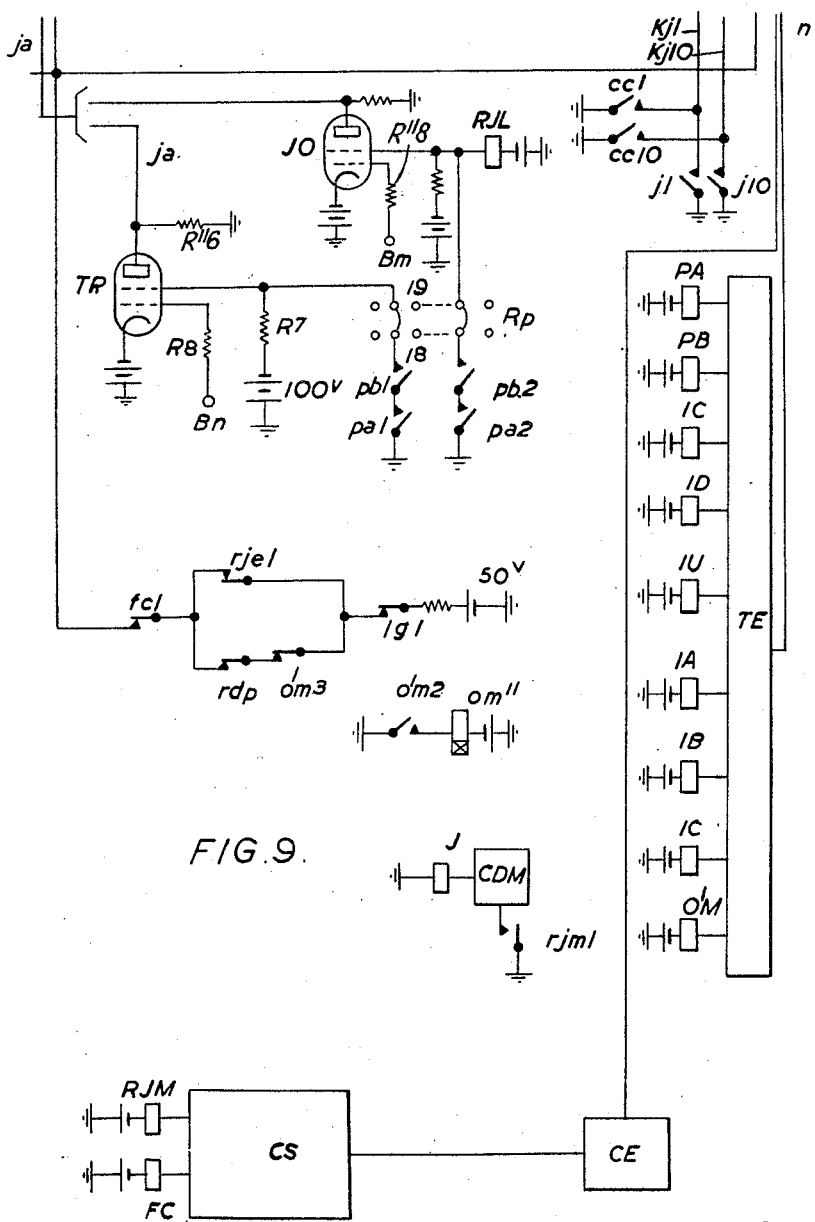
Figure 10:
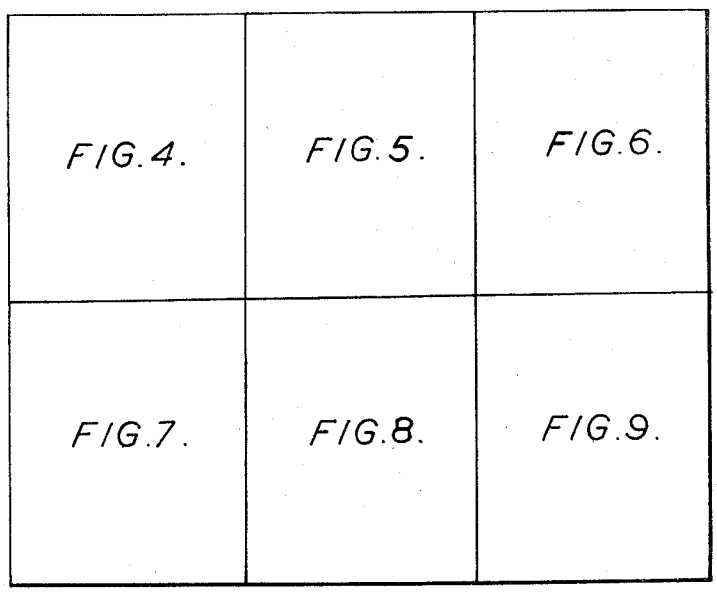
Fig. 10 shows the way in which the Figs. 4, 5, 6, 7, 8 and 9 should be assembled.

A circuit T'E has been shown in Fig. 7 which normally receives indications from an incoming register, such as ERO (Fig. 4), on the number of the called subscriber which has been transmitted to this register from a distant central exchange. This circuit controls five series of ten relays on which are registered the characters of the number of the called subscriber. In order to simplify the drawing, there has been represented only one relay of each group CO, CA, EDC, EDD and EDU on which are respectively registered the two characters of the prefix and the three numerical characters. On the other hand, the circuit T'E controls, when it is actuated, as will be explained further on, the momentary operation of the relay OM which extinguishes the lighted tubes of the registering devices, in order to replace the circuits in rest position. Each of the relays of groups EDC, EDD, and EDU is also controlled by a make contact of the relay corresponding respectively to groups IC, ID and IU (Fig. 9) controlled by the circuit TE. The operation circuits of relays EDC, EDD and EDU which are under the control of contacts $ic$, $id$ and $iu$ are also controlled by contact $rjl.1$ of relay RJL (Fig. 9). The result is that in the case of a local call, as soon as the relay RJL (Fig. 9) operates, the numerical characters of the called subscriber's number which are registered on relays IC, ID IU (Fig. 9) are carried over relays EDC, EDD and EDU. A translating circuit constituted by combinations of contacts of relays EDD and EDC associated with a distribution frame R$p$.1 permits the translation of the character of the hundreds digit and the character of the tens digit into an indication on the position of the vertical selector to which the called subscriber is connected. The obtained information characterises the multiselector of the stage X to which the vertical selector of the subscriber belongs. The position of this vertical selector in the multiselector is, in the considered example, a function of the unit character of the subscriber's number, so that this character does not necessitate any translation. Impulses are applied to terminals A, B and C (Fig. 7) identical to those applied to terminals indexed with the same references as in Fig. 4. It is easy to understand, from explanations given above of the operation of the electronic gate constituted by diodes $dv$, $du$, $dw$, $dt$, $dv'$, $du'$ and associated circuits comprising moreover the translating circuit and the distribution frame R$p$.1, that a negative impulse is obtained at the grid of triode CL.1, the position of which in time characterises the called subscriber.

Figure 8:
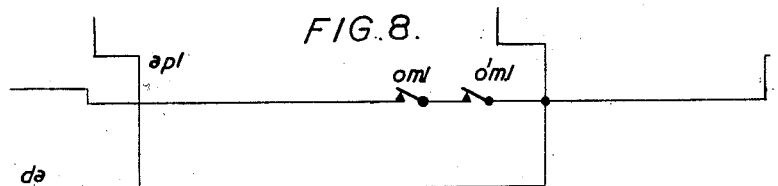
Figure 8:
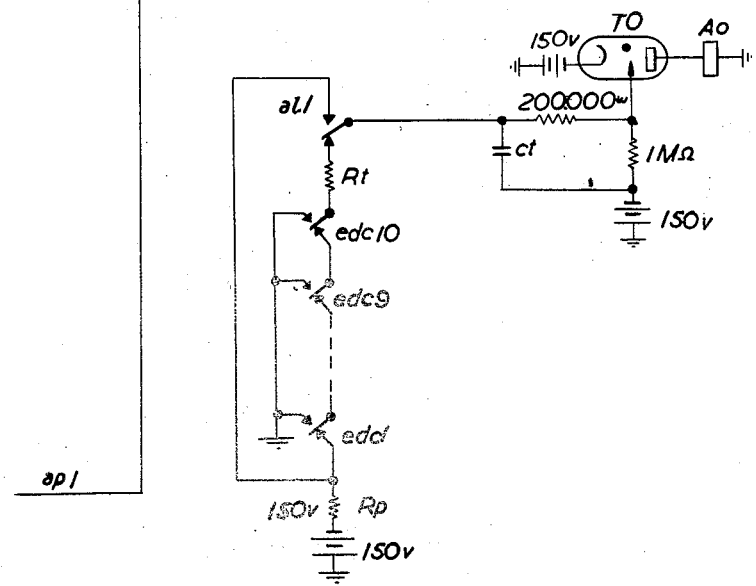

The triode CL.2, the anode of which is connected in parallel with the anode of the triode CL.1, is controlled by impulses obtained by means of a diode pyramid similar to the one used for the detection of the calling lines. The conductors such as $a.d$ (Figs. 7 and 4) are connected to wires $c$ of the circuits of the subscriber line. As has been noted above, wire $c$ is at a potential close to $-48$ volts when the line is free and at a potential close to the potential of ground when the line is busy. Due to the arrangement of diodes $d.i$, $d.j$, $d.k$, $d.l$, $d.m$ and $d.n$ and of impulses A, B, C applied to the corresponding terminals, there is obtained at the grid of triode CL.2 a negative impulse for each free line. If one of these impulses coincides with the impulse applied to the grid of triode CL.1, these two triodes are simultaneously blocked and a positive impulse of sufficient amplitude is applied through condenser C.4 to the electronic gates controlling the cold cathode tubes CA.1 . . . CA.10. This impulse also causes the lighting of cold cathode tube CAL and relay ALR connected in the cathode circuit of this tube operates, indicating that the called subscriber is free. That one of the tubes CA.1 . . . CA.10 which is lighted indicates the impulse A which characterises the horizontal level to which the multiselector belongs and up to which the called subscriber is linked. Impulses A$n$ are obtained at the anode of tube TA'$n$ corresponding to the lighted tube CA.$n$, which impulses are applied through the conductor $apl$ (Figs. 7, 8 and 5) to a diode such as $d.n$ of the left part of the coincidence electronic gate (Fig. 5). The case has been considered in which one of the impulses characterising the free subscribers coincided in time with the impulse applied to the grid of triode CL.1 characterising the called subscriber. If, after a period of time superior to the complete cycle of exploration, no coincidence of impulses on the two grids of tubes CL.1 and CL.2 has been produced, the called subscriber is busy. If this is the case, on the operation of relay EDC (Fig. 7) which corresponds to the hundreds digit, the starting of a timing circuit is caused which is represented in Fig. 8, and this circuit is constituted by an RC gas tube TO the triggering electrode of which is controlled through a circuit comprising a resistance R$t$ and a condenser C$t$. The time constant of the load of the condenser C$t$ is chosen in order that the tube TO will be lighted about 100 milliseconds after the closing of the make contact $edc.n$ of the relay on which the hundreds digit of the number of the called subscriber is registered. If any coincidence of impulses does not happen on the grids of tubes CL.1 and CL.2 during the period of 100 milliseconds, tube TO is lighted, causing the operation of relay AO. This relay controls, by circuits which have not been represented but which are well known in the art, the transmission of the busy tone to the calling subscriber and the release of busy circuits, the transmission circuit of the busy tone remaining under the control of the calling subscriber. If one coincidence is produced, indicating that the called subscriber is free, the relay ALR (Fig. 7) operates and, by its make contact AL.1 it discharges the condenser C$t$. through the resistance R$p$. replacing the timing circuit in its initial state.

At this state of the establishment of the connection, and assuming that the called subscriber is free, there is applied to the circuit which hunts for free linking means, by a conductor $apl$ (Figs. 7, 8 and 5), impulses A characterising the level of the multiselector of stage X to which the called subscriber is connected and by a conductor $g$ (Figs. 6 and 5), impulses C characterising the multiselector of stage Z to which the local chosen junction (on the side of the called subscriber) is connected. The hunting circuit of a group of two linking means, permitting the connection of the called subscriber to the chosen local junction, operates as in the case of the hunting for two linking means permitting the connection of a calling subscriber to a register. The circuit CE (Fig. 9) then controls the operation of the electromagnets of selection and of control by means well known in the art.

As soon as the circuit CE has controlled the establishment of the connection, it causes, through a circuit CS which may be of any type, the operation of relay RJM which indicates that the first connection (between the called subscriber and the local junction) has been established. As has been explained in relation with the description of Fig. 1, the local junctions are connected to two vertical selectors of the same level belonging to two successive multiselectors of stage Z, the calling side being, for example, connected to any multiselector and the called side to the following multiselector. A different law of connection could be adopted, provided that it be the same for all the local junctions. Under these conditions, the ascertaining of the vertical selection of the calling side leads to the knowledge of the multiselector to which the called side of the same junction is connected.

At CDM (Fig. 9) a circuit is shown which is controlled by the operation of relay RJM, and this is represented schematically by the make contact $rjm.1$. This circuit controls a group of ten relays J.1 to J.10 which have been represented schematically by a relay J. Circuits which have not been shown and which are part of the circuit CDM register the position of the multiselector to which the local junction on the called side is connected. This indication may be obtained from the relay actuated in group RJC.1 . . . RJC.10 (Fig. 6) at the moment of the hunting of a free local junction. As soon as relay JLM' operates, the circuit CDM controls the operation of one of the relays J.1 . . . J.10 corresponding to the multiselector to which the local junction of the calling subscribed side is connected. A ground is then connected through a make contact or relay J actuated at the first grid of tube TC.1 . . . TC.10 corresponding to this multiselector. In Figs. 9 and 6 only contacts $j.1$ and $j.10$ have been shown controlling through conductors $k.j.1$ . . . $kj.10$ (Figs. 9 and 7) tubes TC.1 . . . TC.10; impulses C are thus obtained at the grid of tube TC corresponding to the multiselector to which the outgoing junction of the calling subscriber side is connected. Likewise, the first grids of the tubes TA.1 . . . TA.10 (Fig. 4) are operating as electronic gates controlled respectively by contacts $ia.1$ . . . $ia.10$ (Fig. 5) of the relays IA.1 . . . IA.10 (Fig. 9) which register the code of the calling subscriber, and the actuated relay IA corresponds to the relay RA.$n$ (Fig. 4) which is actuated upon the detection of the calling subscriber. Only contacts $ia.1$ and $ia.10$ have been shown in Fig. 5 which, through conductors $i.1$ and $i.10$ (Figs. 5 and 4) control the tubes TA.1 and TA.10 (Fig. 4). It will be understood that impulses A are obtained at the anode of the one of tubes TA.1 . . . TA.10 which is thus also controlled, impulses characterise the multiselector to which the calling subscriber is connected. These impulses are applied through a conductor $f.n$ (Figs. 4 and 5) at the left part of the coincidence electronic gate used for the hunting of a group of two linking means able to connect the calling subscriber to the local junction on the side of the calling subscriber. The choice of a group of two linking means is made as in the case of the connection of the calling subscriber to an initial register and the control of the maintenance and selecting electro-magnets is made by circuit CE (Fig. 9). When this connection is established, the circuit CE controls, through circuit CS, the operation of relay FC (Fig. 9) indicating the end of the connection. The relay FC opens the circuit of the cold cathode tubes by means of its contact $fc.1$ (Fig. 9), and, through contacts not shown, opens the maintenance circuits of the actuated relays in the marker circuit which then returns to rest and is ready to serve a new call.

The case of an incoming call will now be considered. It is assumed that the incoming junction circuit JE (Fig. 6) is calling and loops up the wires $a.1$ and $b.1$ so that the point $jsa$ passes from a potential close to ground potential to a potential close to —48 volts. The identification of the incoming junction is made by means of the pyramid of diodes comprising diodes $di'1$, $di'2$, $di'3$, $di'4$, $di'5$ and $di'6$. The operation of the circuit shown in Fig. 6 is then quite similar to the operation of the circuit of Fig. 4, in the case of the detection and identification of a calling line. However, it must be noted that impulses A and C are applied to terminals bearing the same references, whilst impulses are applied to terminal $Bj$ characteristic of incoming junctions which are different for the ten first impulses obtained from the source B and which are used to characterise the local junctions, the outgoing junctions and the initial registers. These impulses $Bj$ are also used to control electronic gates associated with tubes JJ and JE. It is understood that when an incoming junction is calling, its code is registered on the two groups of cold cathode tubes JA.1 . . . JA.10 and JC.1 . . . JC.10 and that the tube JE is lighted. Impulses $Be$ are applied to the first grid of tube TE which operates as an electronic gate, these impulses $\beta.e$ serving to characterise the incoming registers. As soon as the tube JE is lighted, impulses $Be$ then appear at the anode of tube TE and they are applied through conductor $ja$ (Figs. 6, 5 and 4) to the diode $D'c$ of a pyramid comprising diodes $D'a$, $D'b$, $D'c$ $D'1$, $D'2$ and $D'3$. In addition, impulses A are applied to terminals A and B, and are identical to those applied to corresponding terminals of Fig. 4. This pyramid of rectifiers is connected to wire $c$ of the incoming registers. It is understood that as soon as the impulses $Be$ are applied to the diode $D'c$, the code of a free incoming register is registered on the three groups of cold cathode tubes of Fig. 4, the operation of the circuit being quite similar to the operation of the circuit of Fig. 7 in the case of the hunting for an initial register. The tube DE is lighted indicating that the code registered on the three groups of the cold cathode tubes is the code of an incoming register. The operation of the circuit which leads to the connection of the incoming junction to the incoming register is similar to the operation described in the case of the connection of a calling line to an initial register. The incoming register ERO then receives from the distant exchange the number of the called subscriber and it receives also from the incoming junction the code of this junction. When this information has been registered, the incoming register causes its connection to the marker by means which have not been shown. It then transmits, in the form of signals of any type (impulse combinations or voice frequency combinations), information to circuit T'E of the marker which registers them on groups of relays. Two groups of ten relays (only one of each group having been shown) CC and CA are used to register the co-ordinates of the incoming junction and three groups of relays EDC, EDD, EDU are used to register numerical characters of the called subscriber's number. The circuit T'E also causes, on the seizure of the marker circuit, the operation of relay OM which opens the feeding circuits of the cold cathode tubes by means of its contact $om.1$ (Fig. 8) to replace all the circuits in rest position.

The called subscriber's number which is registered on relays EDC, EDD, EDU is used for hunting the called subscriber, as in the case of a local call, and impulses are obtained on one of the conductors $apl$ charasterising all the outputs of the horizontal level of stage X to which the multiselector belongs which is connected to the called subscriber. The information registered on the group of relays CC characterise the multiselector to which the incoming junction is connected. Contacts $cc.1$ . . . $cc.10$ of relays CC (Fig. 7) are placed in parallel with contacts $j.1$ . . . $j.10$ (Fig. 9); these contacts $cc.1$ . . . $cc.10$ thus control tubes TC.1 . . . TC.10 (Fig. 6) in the same manner that contacts $j.1$ . . . $j.10$ control these tubes. The result is that as soon as the relay of group CC operates which characterises the multiselector of stage Z to which the incoming junction is connected, it unblocks by means of its contact $cc$ the corresponding tube TC (Fig. 6). At the anode of this tube impulses C are obtained which are applied by one of the conductors $g1$ . . . $g10$ (Figs. 6 and 5) to the coincidence electronic gate used for the hunting of the two free linking means between the stages X and Z. The information registered on the group of relays CA is used in a conventional way by the circuit CE to control the operation of selection electromagnets and maintenance electromagnets, the operation of the circuit being identical to the operation described in relation with the connection of a local junction to a called subscriber.

There has been schematically shown at the bottom of Fig. 7 an arrangement which causes the release of the marking circuit after a given interval of time if the switchings controlled by the marking circuit have not been made. The cold cathode tube TG is normally blocked and, as soon as the marker is seized, which is characterised according to the case by the operation of one of relays OM (Fig. 7), RDP (Fig. 4), RJE (Fig. 6) or O'M (Fig. 9), a contact of the one of these relays which is actuated closes the load circuit of condenser $Cg$. If, after an interval of time determined by the time constant of the charge of the condenser $Cg$, one of the relays RV.1 . . . RV.10 has not operated, indicating that the test of the linking means has not been made, or that the linking means capable of being used are busy, the tube TG lights causing the operation of relay LG connected in its anode circuit. The relay LG, which may be used to control, for example, the busy controlling circuits, opens the high voltage feeding circuit of the marker tubes by its contact $lg.1$ (Fig. 9) and the marker is then ready to serve another call. The relay LG may also be used to control, by means well known which have not been shown, the transmission of the busy tone to the calling subscriber. In the case of the operation of one of the relays RV.1 . . . RV.10, the condenser $Cg$ is discharged and the operation of the marker goes on as it has been described.

It has been assumed in the description that the marking circuit was not taken simultaneously by two calling circuits, which assumption is in great part justified by the speed of operation of the marking circuit. However, in order to avoid the drawbacks which will result of a simultaneous seizing of the marker, for example through a calling line and an incoming junction, there has been provided the back contact $rje.1$ in parallel with the back contacts $rdp$ and $o'm3$ (Fig. 9). It is understood that in the case above mentioned of simultaneous seizing of the marker, relays RJE (Fig. 6) and RDP (Fig. 4) operate, causing the opening of the high voltage feeding circuit of the cold cathode tubes of the marker which then comes back to rest. The circuit described operates in the same way, by the sets of contacts rje.1 and o'm3 (Fig. 9) in the case of the simultaneous seizing of the marker by an initial calling register and a calling incoming junction.

While the principles of the invention have been described above in connection with specific embodiments and particular modifications thereof, it is to be clearly understood that this description is made only by way of example and not as a limitation on the scope of the invention.

What is claimed is:

1. A switching system comprising a plurality of stages of multiselector switches, a plurality of circuits for connecting the outputs of a multiselector switch of one stage wtih the inputs of a multiselector switch of another stage, impulse means for marking and characterising said circuits, and coincidence impulse responsive means at a given stage for detecting a multiselector to which are connected two of said circuits marked by impulses characterising respectively the multiselectors which must be interconnected from an output of one to an input of the other by means of said two circuits.

2. A switching system having first, second and third multiselector stages with transversal bars, said first stage having a plurality of multiselectors each having a plurality of outputs, said second stage having a plurality of multiselectors each having a plurality of inputs and outputs, said third stage having a plurality of multiselectors each having a plurality of inputs, connections between said first and second stages and connections between said second and third stages in order that the outputs of one multiselector of said first stage may be respectively connected to the inputs belonging to different multiselectors of said second stage and in order that the inputs of a multiselector of said third stage may be respectively connected to the outputs belonging to different multiselectors of said second stage, a hunting system comprising a plurality of pairs of linking means for connecting one of the outputs of a given multiselector of the first stage to one of the inputs of a given multiselector of said third stage, first, second and third groups of sources of different electrical characteristics, means for marking the linking means connected to the outputs of a given multiselector of the first stage with a characteristic chosen from amongst those of said first group of sources, means for marking the linking means connected to the inputs of a given multiselector of said third stage with a characteristic chosen from amongst those of said third group of sources, means for marking the free linking means connected to the inputs and to the outputs of the multiselectors of said second stage with different characteristics chosen from amongst those of said second group of sources, means adapted to detect the coincidence of three electrical characteristics belonging to said different groups, which characteristics characterize respectively a multiselector of the first stage, a multiselector of said second stage, and a multiselector of said third stage, and means for successively connecting said detecting means to said pairs of linking means connected to different multiselectors of said second stage.

3. A switching system comprising a plurality of stages of multiselector switches, a plurality of link circuits for connecting the outlets of the multiselector switches of one stage respectively to the inlets of different multiselector switches of the next succeeding stage, a plurality of lines connected respectively to the inlets of the multiselector switches of the first stage, a plurality of registers connected respectively to certain outlets of the multiselector switches of the last stage, a plurality of junction circuits, each connected respectively to two of certain other outlets of the multiselector switches of said last stage, a marker circuit, impulse means responsive to a call on a line for transmitting the identity of said line to said marker circuit, impulse means operated by said last-mentioned means for hunting for and finding a free register, means operated by said hunting and finding means for transmitting the identity of said register to said marker, impulse means for selecting free link circuits adapted to connect said calling line with said identified register, means operated by said marker circuit for operating said multiselector switches of said stages for establishing a connection between said calling line and said register over said selected link circuits, means responsive to the establishment of said connection for releasing said marker circuit and said hunting and finding means, means responsive to the receipt of the called number in said register for seizing said marker again and for transmitting thereto signals identifying said calling line and said called line, means controlled by said marker for testing for the free or busy condition of said called line, means controlled by said marker for selecting a free junction circuit, means controlled by said marker for testing for the free or busy condition of link circuits adapted to connect said calling line and said called line with said junction circuit, and means in said marker responsive to said testing means for operating said multiselectors to connect both said calling and called lines to said junction over said link circuits.

References Cited in the file of this patent

UNITED STATES PATENTS

| | | |
|---|---|---|
| 2,664,467 | Den Hertog | Dec. 29, 1953 |
| 2,667,540 | Den Hertog | Jan. 26, 1954 |